(12) United States Patent
Xu et al.

(10) Patent No.: US 11,154,793 B2
(45) Date of Patent: Oct. 26, 2021

(54) APPARATUS FOR GAS-LIQUID CONTACTING

(71) Applicant: UOP LLC, Des Plaines, IL (US)

(72) Inventors: Zhanping Xu, Inverness, IL (US); Emadoddin Abbasi, Oak Park, IL (US)

(73) Assignee: UOP LLC, Des Plaines, IL (US)

( * ) Notice: Subject to any disclaimer, the term of this patent is extended or adjusted under 35 U.S.C. 154(b) by 224 days.

(21) Appl. No.: 15/938,993

(22) Filed: Mar. 28, 2018

(65) Prior Publication Data

US 2019/0299117 A1 Oct. 3, 2019

(51) Int. Cl.
*B01D 3/20* (2006.01)
*B01F 3/04* (2006.01)
*B01D 3/22* (2006.01)
*B01D 47/02* (2006.01)

(52) U.S. Cl.
CPC ........... *B01D 3/20* (2013.01); *B01D 3/22* (2013.01); *B01F 3/04751* (2013.01); *B01D 47/025* (2013.01)

(58) Field of Classification Search
CPC .......... B01D 3/20; B01D 3/22; B01D 47/025; B01F 3/04751
USPC ............................................. 261/114.1, 114.5
See application file for complete search history.

(56) References Cited

U.S. PATENT DOCUMENTS

| | | | | |
|---|---|---|---|---|
| 3,179,712 A * | 4/1965 | Carson | ....................... | C07C 2/62 585/716 |
| 3,441,498 A * | 4/1969 | Jubin, Jr. et al. | .......... | B01J 8/22 208/143 |
| 4,478,707 A * | 10/1984 | Bischoff | ................ | B01J 8/1818 208/153 |
| 4,571,326 A * | 2/1986 | Bischoff | .................... | B01J 8/12 261/122.1 |
| 4,639,354 A * | 1/1987 | Bischoff | ................ | B01J 8/1818 261/122.1 |
| 4,659,455 A * | 4/1987 | Dall | ........................ | B01J 8/003 208/108 |
| 4,707,340 A * | 11/1987 | Milligan | ................ | B01J 8/1827 261/114.5 |
| 4,985,209 A * | 1/1991 | Renard | .................... | B01J 8/085 422/140 |

(Continued)

FOREIGN PATENT DOCUMENTS

| | | |
|---|---|---|
| CN | 102580342 A | 7/2012 |
| CN | 104215114 A | 12/2014 |

(Continued)

OTHER PUBLICATIONS

International Search Report from PCT Application No. PCT/US2019/024467, dated Aug. 15, 2019.

(Continued)

*Primary Examiner* — Charles S Bushey

(57) ABSTRACT

The present invention relates to an apparatus for gas-liquid contacting and gas distribution in a bubble contactor. More specifically, the present invention relates to a gas-liquid distribution device that may be used in an ionic liquid co-current gas and liquid up-flow regenerator designed to distribute gas uniformly across the regenerator cross section through restriction orifices on a distribution plate with liquid upcomers.

18 Claims, 2 Drawing Sheets

(56) References Cited

U.S. PATENT DOCUMENTS

| | | | |
|---|---|---|---|
| 5,885,534 A * | 3/1999 | Reynolds | B01F 5/0475 |
| | | | 422/140 |
| 6,123,323 A * | 9/2000 | Yoneda | B01D 3/16 |
| | | | 261/113 |
| 7,956,002 B2 | 6/2011 | Elomari et al. | |
| 7,988,928 B2 * | 8/2011 | Augier | B01J 8/0278 |
| | | | 422/220 |
| 8,206,657 B2 | 6/2012 | Augier et al. | |
| 9,242,220 B2 | 1/2016 | Vimalchand et al. | |
| 2004/0045870 A1 | 3/2004 | Wrisberg et al. | |
| 2013/0280138 A1 | 10/2013 | Johnson et al. | |
| 2019/0001292 A1 * | 1/2019 | Xu | B01J 8/0453 |

FOREIGN PATENT DOCUMENTS

| | | |
|---|---|---|
| CN | 106732190 A | 5/2017 |
| EP | 0827765 A2 | 3/1998 |
| RU | 2235757 C1 | 9/2004 |
| RU | 2585174 C1 | 5/2016 |
| SU | 1699482 A2 | 12/1991 |

OTHER PUBLICATIONS

Written Opinion from PCT Application No. PCT/US2019/024467, dated Jul. 18, 2019.
International Preliminary Report on Patentability from PCT Application No. PCT/US2019/024467, dated Sep. 29, 2020.

* cited by examiner

APPARATUS FOR GAS-LIQUID CONTACTING

FIELD

The present invention relates to an apparatus for gas-liquid contacting and gas distribution in a bubble contactor. More specifically, the present invention relates to a gas-liquid distribution device that may be used in an ionic liquid co-current gas and liquid up-flow regenerator designed to distribute gas uniformly across the regenerator cross section through restriction orifices on a distribution plate with liquid upcomers.

BACKGROUND

In the co-current gas-liquid upflow reactors, liquid is the continuous phase and gas is the dispersed phase. It is critical to distribute gas uniformly across the reactor cross section, which is achieved by building a gas chamber under a distribution plate so that gas can be distributed through restriction orifices across a distribution plate. Good gas distribution requires there to be a stable gas-liquid interface below the plate.

The simplest fluid distribution/redistribution device for bubble contactor is a sieve plate. However, the gas and liquid flows across the plate are unsteady due to the competition of gas and liquid passing through the same perforations, resulting in plate pulsation.

SUMMARY

The present invention is a gas-liquid distribution plate that may be used in gas-liquid co-current up-flow bubble contactors such as an ionic liquid regenerator for regenerating spent ionic liquid from an ionic liquid alkylation reactor. The plate is designed to distribute gas uniformly across the regenerator cross section through restriction orifices on the distribution plate with liquid upcomers.

In some bubble contactors for mass transfer or reaction, multiple stages are required for achieving desired product purity or conversion. As discussed above, the simplest fluid distribution/redistribution device for the bubble contactor is sieve plate. However, the gas and liquid flows across the plate are unstable due to the competition of gas and liquid passing through the same perforations, resulting in plate pulsation. This problem can be resolved by adding upcomers to the plate for liquid to bypass so that gas and liquid pass across the plate through different routes. There may be one or more liquid upcomers on each plate. In addition, liquid backmixing in an upflow bubble contactor should be limited within a compartment between two plates and liquid downward flow across the plates through liquid upcomers should be avoided by designing the liquid upcomers properly with the appropriate number, size, and location on the plates.

A first embodiment of the invention is an apparatus for gas-liquid contacting, comprising a tubular housing; an inlet nozzle and an outlet nozzle which are affixed to the bottom and top opening of the tubular housing; a bubble cap may be attached to the bottom inside of the tubular housing for gas pre-distribution; a plurality of distribution plates affixed to the inside of the tubular housing; and one liquid upcomer affixed to the distribution plates wherein the liquid upcomer includes a first opening and a second opening at two ends.

A second embodiment of the invention is an apparatus for gas-liquid contacting, comprising a tubular housing; one inlet nozzle and one outlet nozzle which is affixed to the bottom and top opening of the tubular housing; a bubble cap may be attached to the bottom inside of the tubular housing for gas pre-distribution; at least one distribution plate affixed to the inside of the tubular housing; and a plurality of liquid upcomers affixed to each of the distribution plates wherein each liquid upcomer includes a first opening and a second opening at two ends.

A third embodiment of the invention is an apparatus for gas-liquid contacting, comprising a tubular housing located in an ionic liquid co-current gas and liquid up-flow reactor designed to distribute gas uniformly across the regenerator cross section, wherein the tubular housing includes a gas space and a liquid space below each distribution plate wherein the gas space is located above the liquid space; one inlet nozzle and one outlet nozzle which are affixed to the bottom and top opening of the tubular housing; a plurality of distribution plates affixed to the inside of the tubular housing; and at least one liquid upcomer affixed to each of the distribution plates wherein the liquid upcomer includes a first opening and a second opening, wherein the first opening of the liquid upcomer is located in the liquid space below the plate and the second opening is located in the liquid space at or above the upper surface of each plate, wherein at least part of the liquid upcomers is submerged in the liquid space.

A fourth embodiment of the invention is an apparatus for gas-liquid contacting, comprising a tubular housing located in an ionic liquid co-current gas and liquid up-flow regenerator designed to distribute gas uniformly across the regenerator cross section, wherein the tubular housing includes a gas space and a liquid space below each distribution plate wherein the gas space is located above the liquid space; one inlet nozzle and one outlet nozzle which are affixed to the bottom and top opening of the tubular housing; a plurality of distribution plates affixed to the inside of the tubular housing; and at least one liquid upcomer affixed to each of the distribution plates wherein the liquid upcomer includes a first opening and a second opening, wherein the first opening of the liquid upcomer is located in the liquid space below the plate and the second opening is located in the liquid space at or above the plate upper surface, wherein at least part of the liquid upcomers is submerged in the liquid space; wherein no liquid upcomer is located near the center of the plate.

In the foregoing, all temperatures are set forth in degrees Celsius and, all parts and percentages are by weight, unless otherwise indicated. Other objects, advantages and applications of the present invention will become apparent to those skilled in the art from the following detailed description and drawings. Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The description of the apparatus of this invention is presented with reference to the attached drawings. The drawings are a simplified diagrams of the preferred embodiments of this invention and are not intended as an undue limitation on the generally broad scope of the description provided herein and the appended claims. Certain hardware such as valves, pumps, compressors, heat exchangers, instrumentation and controls, have been omitted as not essential to a clear understanding of the invention. The use and application of this hardware is well within the skill of the art.

Figure 1:
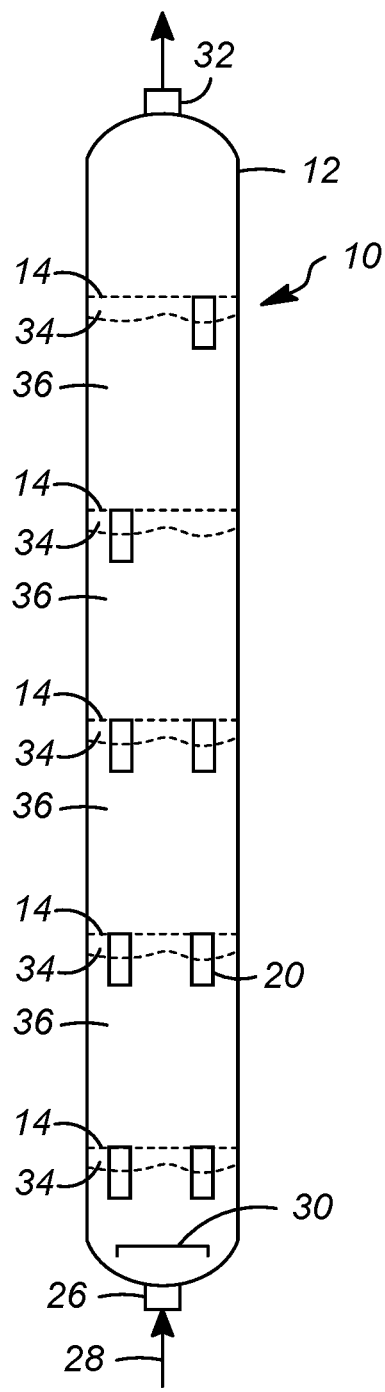
FIG. 1 illustrates a tubular housing having a plurality of gas-liquid distribution plates that may be used in gas-liquid co-current up-flow bubble contactors such as an ionic liquid regenerator.

The various embodiments described herein relate to a gas-liquid contactor and gas-liquid distribution plates. As shown in FIG. 1, an apparatus 10 comprises of a tubular housing 12 comprising an inlet nozzle 26, a bubble cap 30, a plurality of distribution plates 14, and an outlet nozzle 32. The bubble cap is on the bottom portion of the tubular housing 12 and extends upwards towards the lowest distribution plate 14. The bubble cap may be cylindrical and includes openings 40 on sides and top of the cap. Gas and liquid 28 entering into the bubble contactor from bottom are initially distributed by the bubble cap 30 to the lowest distribution plate 14.

Figure 2:
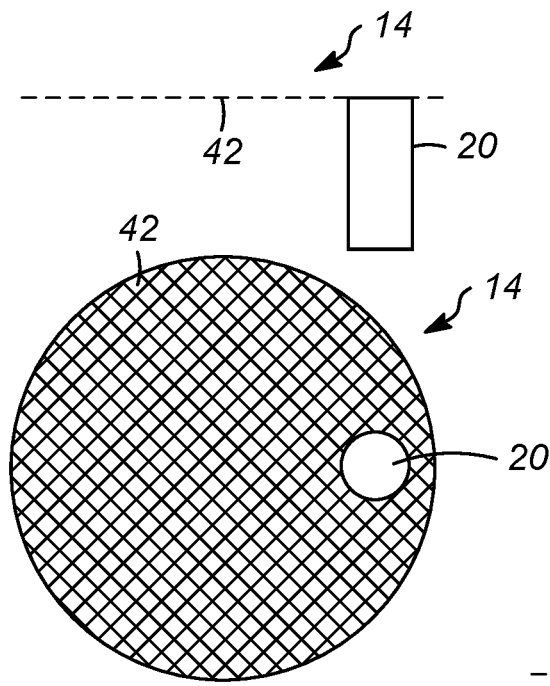
FIG. 2 illustrates a gas-liquid distribution plate with one liquid upcomer that may be used in gas-liquid co-current up-flow bubble contactors such as an ionic liquid regenerator.
Figure 3:
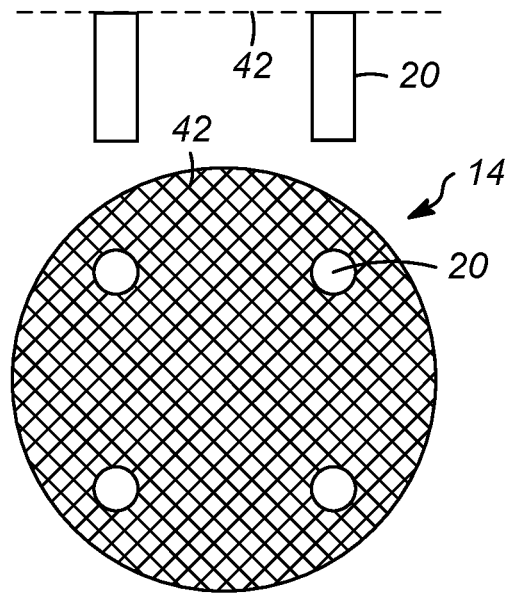
FIG. 3 illustrates a gas-liquid distribution plate with four liquid upcomers that may be used in gas-liquid co-current up-flow bubble contactors such as an ionic liquid regenerator with no liquid upcomers near center of the device.

The distribution plates 14 includes horizontal plates affixed to the inside of the housing 12 that includes one or a plurality of liquid upcomers 20 that are coupled to the distribution plate 14 and located at various locations around the distribution plate 14. The liquid upcomers 20 are connected to and pass through the distribution plates 14 and extend downward about 4 to 24 inches, or preferably 6 to 12 inches. In the example shown in FIG. 1, a gas space 34 of about 0.5 to 6 inches, preferably about 1 to 4 inches, is established under each plate by restricting the gas flow through perforations on the plate. As such, the top portion of the liquid upcomers 20 is in the gas space 34 and the rest of the liquid upcomers are in the liquid space 36. In the example shown in FIG. 2, there is one liquid upcomer 20 affixed to the distribution plate 14. In the example shown in FIG. 3, there are four liquid upcomers 20 affixed to the distribution plate 14. It is contemplated that any amount of liquid upcomer 20 may be affixed to the distribution plate 14. In the example shown in FIGS. 2 and 3, the liquid upcomers are cylindrical and hollow in the inside, shaped like a tube. This allows the liquid in the liquid space 36 to enter the liquid upcomer 20 and rise up through the distribution plate 14. Computational fluid dynamics (CFD) simulations show that the location of the liquid upcomers should be carefully chosen such that there will be no liquid downflow through some of the upcomers causing liquid back-mixing. For example, if a central liquid upcomer is added to the distribution plate as shown in FIG. 3, liquid may flow downward through it rather than up as other upcomers. The downward liquid flow through the central upcomer is caused by liquid circulation above the plate with upward liquid flow on sides and downward liquid along the center. Holes 42 on the distribution plate are for gas passing through the plate. The total open hole area is limited to build a gas chamber underneath the plate for uniform gas distribution across the plate.

Figure 4:
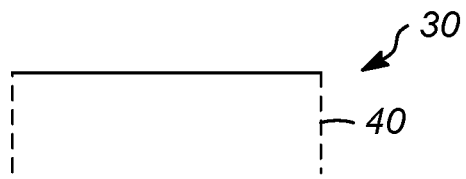
FIG. 4 illustrates a bubble cap with openings on side for pre-distribution of gas at bottom inlet of the bubble contactor.

FIG. 4 shows a bubble cap 30 attached to bottom inside of the tubular housing for pre-distribution of gas to the lowest distribution plate 14. The diameter of the bubble cap is at least 50%, or more preferably at least 70%, of the tubular housing diameter.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

While the invention has been described with what are presently considered the preferred embodiments, it is to be understood that the invention is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is an apparatus for gas-liquid contacting, comprising a tubular housing; a distribution plate affixed to the inside of the tubular housing;

and a liquid upcomer affixed to the distribution plate wherein the liquid upcomer includes a first opening and a second opening. An embodiment of the invention is one, any or all of prior embodiments in this paragraph up through the first embodiment in this paragraph, wherein there is 1 distribution plate affixed to the inside of the tubular housing. An embodiment of the invention is one, any or all of prior embodiments in this paragraph up through the first embodiment in this paragraph, wherein there are 5 distribution plates affixed to the inside of the tubular housing. An embodiment of the invention is one, any or all of prior embodiments in this paragraph up through the first embodiment in this paragraph, wherein there is 1 liquid upcomer affixed to the distribution plate. An embodiment of the invention is one, any or all of prior embodiments in this paragraph up through the first embodiment in this paragraph, wherein there are 4 liquid upcomers affixed to the distribution plate. An embodiment of the invention is one, any or all of prior embodiments in this paragraph up through the first embodiment in this paragraph, wherein there are no liquid upcomers affixed to the center of the distribution plate. An embodiment of the invention is one, any or all of prior embodiments in this paragraph up through the first embodiment in this paragraph, wherein the tubular housing includes a gas space and a liquid space below the distribution plate wherein the gas space is located above the liquid space. An embodiment of the invention is one, any or all of prior embodiments in this paragraph up through the first embodiment in this paragraph, wherein the first opening of the liquid upcomers is located in the liquid space below the plate and the second opening is located at or above the upper surface of the plate in the liquid space. An embodiment of the invention is one, any or all of prior embodiments in this paragraph up through the first embodiment in this paragraph, wherein at least part of the liquid upcomers is located in the liquid space. An embodiment of the invention is one, any or all of prior embodiments in this paragraph up through the first embodiment in this paragraph, wherein the liquid upcomer openings are at two ends. An embodiment of the invention is one, any or all of prior embodiments in this paragraph up through the first embodiment in this paragraph, wherein the liquid upcomers are cylindrical. An embodiment of the invention is one, any or all of prior embodiments in this paragraph up through the first embodiment in this paragraph, further comprising an inlet nozzle and an outlet nozzle affixed to the top and bottom of the tubular housing.

A second embodiment of the invention is an apparatus for gas-liquid contacting, comprising a tubular housing; a distribution plate affixed to the inside of the tubular housing; and a plurality of liquid upcomers affixed to the distribution plate wherein the liquid upcomers include a first opening and a second opening. An embodiment of the invention is one, any or all of prior embodiments in this paragraph up through the second embodiment in this paragraph, wherein the tubular housing includes a gas space and a liquid space below the plate wherein the gas space is located above the liquid space. An embodiment of the invention is one, any or all of prior embodiments in this paragraph up through the second embodiment in this paragraph, wherein the first opening of the liquid upcomer is located in the liquid space below the plate and the second opening is located at or above the upper surface of the plate in the liquid space. An embodiment of the invention is one, any or all of prior embodiments in this paragraph up through the second embodiment in this paragraph, further comprising at least one of a processor; a memory storing computer-executable instructions; a sensor positioned at a location to sense at least one parameter; and a receiver configured to receive data from the sensor. An embodiment of the invention is one, any or all of prior embodiments in this paragraph up through the second embodiment in this paragraph, wherein the liquid upcomer has openings at two ends.

A third embodiment of the invention is an apparatus for gas-liquid contacting and ionic liquid regeneration, comprising a tubular housing, a plurality of distribution plates affixed to the inside of the tubular housing; and a liquid upcomer affixed to each of the distribution plates wherein the liquid upcomer includes a first opening and a second opening, wherein the first opening of the liquid upcomer is located in the liquid space below the plates and the second opening is located at or above upper surface of the plates, wherein at least part of the liquid upcomers is located in the liquid space below the plate. An embodiment of the invention is one, any or all of prior embodiments in this paragraph up through the third embodiment in this paragraph, wherein there are 4 liquid upcomers affixed to the distribution plate. An embodiment of the invention is one, any or all of prior embodiments in this paragraph up through the third embodiment in this paragraph, wherein there are no liquid upcomers affixed to the center of the distribution plate.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An ionic liquid regenerator for co-current gas-liquid contacting, comprising:
   a tubular housing with a regenerated ionic liquid outlet at a top of the tubular housing;
   at least three and no more than five distribution plates affixed to an inside of the tubular housing; and
   at least one liquid upcomer affixed to each of the distribution plates,
   wherein the at least one liquid upcomer includes a first opening at a first end and a second opening at a second end, and
   wherein the liquid upcomer extends through the distribution plate, and
   wherein there are no liquid upcomers affixed to a center portion of any of the distribution plates such that liquid back-mixing is avoided.

2. The ionic liquid regenerator of claim 1, wherein a bubble cap is disposed below the distribution plates.

3. The ionic liquid regenerator of claim 1, wherein the apparatus comprises five distribution plates affixed to the inside of the tubular housing.

4. The ionic liquid regenerator of claim 1, wherein there is one liquid upcomer affixed to one of the distribution plates.

5. The ionic liquid regenerator of claim 1, wherein there are four liquid upcomers affixed to one of the distribution plates.

6. The ionic liquid regenerator of claim 1, wherein the tubular housing includes a gas space and a liquid space below each of the distribution plates, and wherein the gas space is located above the liquid space.

7. The ionic liquid regenerator of claim 1, wherein the first opening of each of the liquid upcomers is located in a first liquid space below each of the distribution plates and the second opening is located at an upper surface of the distribution plates in a second liquid space.

8. The ionic liquid regenerator of claim 6, wherein at least part of the at least one liquid upcomer is located in the liquid space.

9. The ionic liquid regenerator of claim 1, wherein the first and second ends are two opposite ends of equal size.

10. The ionic liquid regenerator of claim 1, wherein the at least one liquid upcomer is cylindrical and extends from a lower liquid space to an upper liquid space.

11. The ionic liquid regenerator of claim 1, further comprising an inlet nozzle affixed to the bottom of the tubular housing.

12. An ionic liquid regenerator for co-current gas-liquid contacting, comprising:
    a tubular housing with a regenerated ionic liquid outlet at a top of the tubular housing;
    at least three and no more than five distribution plates affixed to the inside of the tubular housing; and
    a plurality of liquid upcomers affixed to a first distribution plate and a second distribution plate wherein the liquid upcomers comprise tubes with a first opening and a second opening,
    wherein the first opening and second opening are at opposite ends of each liquid upcomer, and
    wherein only a first of the plurality of liquid upcomers is affixed to the first distribution plate and only a second of the plurality of liquid upcomers is affixed to the second distribution plate such that the first and the second liquid upcomers are offset.

13. The ionic liquid regenerator of claim 12, wherein the tubular housing includes a gas space and a liquid space below the plate wherein the gas space is located above the liquid space.

14. The ionic liquid regenerator of claim 12, wherein the first opening is located in a first liquid space below the distribution plate and the second opening is located at the upper surface of the distribution plate in a second liquid space.

15. The ionic liquid regenerator of claim 12, further comprising at least one of:
    a processor;
    a memory storing computer-executable instructions;
    a sensor positioned at a location to sense at least one parameter; and a receiver configured to receive data from the sensor.

16. The ionic liquid regenerator of claim 12, wherein the first and second openings of each liquid upcomer are of equal size.

17. An ionic liquid regenerator for gas-liquid contacting, comprising:
    a tubular housing with a regenerated ionic liquid outlet at a top of the tubular housing;
    at least three and no more than five distribution plates affixed to the inside of the tubular housing;
    a liquid upcomer affixed to a respective one of the distribution plates; and
    a bubble cap is disposed below the distribution plates,
    wherein the liquid upcomer includes a first opening at a first end and a second opening at a second end,
    wherein the first opening of the liquid upcomer is located in a liquid space below the respective distribution plate and the second opening is located at an upper surface of the respective distribution plate,
    wherein at least part of the liquid upcomer is located in the liquid space below the respective distribution plate,
    wherein there are no liquid upcomers affixed to a center portion of any of the distribution plates such that liquid back-mixing is avoided, and
    wherein a diameter of the bubble cap is at least 50% of a diameter of the tubular housing.

18. The ionic liquid regenerator of claim 17, wherein there are four liquid upcomers affixed to one of the distribution plates.

* * * * *